US012520917B2

(12) United States Patent
Vuille et al.

(10) Patent No.: US 12,520,917 B2
(45) Date of Patent: Jan. 13, 2026

(54) METHOD FOR MANUFACTURING AN EXTERNAL COMPONENT OF A WATCH, OF A FASHION ITEM OR OF A JEWELLERY ITEM

(71) Applicant: Comadur SA, Le Locle (CH)

(72) Inventors: Pierry Vuille, Les Emibois (CH); Jan Lintymer, Mamirolle (FR); Benoit Giry, Villers-le-lac (FR); Gabriel Rittiner, Le Locle (CH)

(73) Assignee: Comadur SA, Le Locle (CH)

( * ) Notice: Subject to any disclaimer, the term of this patent is extended or adjusted under 35 U.S.C. 154(b) by 0 days.

(21) Appl. No.: 18/468,082

(22) Filed: Sep. 15, 2023

(65) Prior Publication Data

US 2024/0099433 A1 Mar. 28, 2024

(30) Foreign Application Priority Data

Sep. 16, 2022 (EP) .................................... 22196167

(51) Int. Cl.
*A44C 27/00* (2006.01)
*G04D 3/00* (2006.01)

(52) U.S. Cl.
CPC ......... *A44C 27/007* (2013.01); *G04D 3/0069* (2013.01); *G04D 3/0092* (2013.01)

(58) Field of Classification Search
CPC ... A44C 27/007; G04D 3/0069; G04D 3/0092
See application file for complete search history.

(56) References Cited

U.S. PATENT DOCUMENTS

| | | | |
|---|---|---|---|
| 6,538,959 | B1 | 3/2003 | Yamaguchi et al. |
| 2004/0239750 | A1 | 12/2004 | Kneer et al. |
| 2006/0256666 | A1 | 11/2006 | Lee |
| 2009/0104409 | A1 | 4/2009 | Derriey et al. |
| 2009/0305445 | A1 | 12/2009 | Ikeda et al. |

(Continued)

FOREIGN PATENT DOCUMENTS

| | | | |
|---|---|---|---|
| CH | 713 871 | A1 | 1/2019 |
| CN | 112289172 | A | 1/2021 |

(Continued)

OTHER PUBLICATIONS

Japanese Office Action issued Aug. 6, 2024 in Japanese Application 2023-122184, (with unedited computer-generated English translation), 10 pages.

(Continued)

*Primary Examiner* — Nathan T Leong
(74) *Attorney, Agent, or Firm* — Oblon, McClelland, Maier & Neustadt, L.L.P.

(57) ABSTRACT

A method for manufacturing an external component of a watch, of a fashion item or of a jewellery item, including depositing an inner layer on all or part of the surface of an inner face of a substrate made of a transparent material, localised ablation of the inner layer, so as to conserve a part of the inner layer on a first portion of the inner face f the substrate, the ablation being performed so as to form at least one pocket opening onto a second portion of the inner face of the substrate and so as to structure the second portion of the inner fa of the substrate, treating the surface of the inner layer and of the second portion of the inner face of the substrate.

11 Claims, 2 Drawing Sheets

(56) References Cited

U.S. PATENT DOCUMENTS

| | | | |
|---|---|---|---|
| 2014/0370325 A1 | 12/2014 | Nashner et al. | |
| 2015/0146504 A1 | 5/2015 | Derriey et al. | |
| 2016/0178807 A1 | 6/2016 | Sagardoyburu | |
| 2017/0107605 A1 | 4/2017 | Chun | |
| 2020/0292996 A1 | 9/2020 | Jeanrenaud et al. | |
| 2020/0293001 A1 * | 9/2020 | Jeanrenaud .......... | G04D 3/0092 |

FOREIGN PATENT DOCUMENTS

| | | |
|---|---|---|
| EP | 0 985 985 B1 | 3/2003 |
| EP | 2 881 808 A2 | 6/2015 |
| EP | 1 893 542 B1 | 8/2017 |
| EP | 3 037 897 B1 | 4/2020 |
| EP | 3 708 384 A1 | 9/2020 |
| EP | 3 709 102 A1 | 9/2020 |
| EP | 3 951 512 A1 | 2/2022 |
| JP | 10-253773 A | 9/1998 |
| JP | 2002-148359 A | 5/2002 |
| JP | 2003-130970 A | 5/2003 |
| JP | 2016-183961 A | 10/2016 |
| JP | 2020-148765 A | 9/2020 |
| KR | 20-0464135 Y1 | 12/2012 |

OTHER PUBLICATIONS

Japanese Office Action issued Jan. 7, 2025, in corresponding Japanese Patent Application No. 2023-122184 (with English Translation), 10 pages.

European Search Report issued Feb. 21, 2023 in European Application 22196167.5 filed on Sep. 16, 2022, 4 pages (with English Translation of Categories of Cited Documents).

Combined Chinese Office Action and Search Report issued Jun. 18, 2025 in Chinese Patent Application No. 202311198009.3, 8 pages.

Office Action Issued Sep. 2, 2025 in Japanese Patent Application No. 2023-122184, which English translation.

* cited by examiner

METHOD FOR MANUFACTURING AN EXTERNAL COMPONENT OF A WATCH, OF A FASHION ITEM OR OF A JEWELLERY ITEM

CROSS-REFERENCE TO RELATED APPLICATION

This application claims priority to European Patent Application No. 22196167.5 filed on Sep. 16, 2022, the entire disclosure of which is hereby incorporated herein by reference.

TECHNICAL FIELD OF THE INVENTION

The invention falls within the field of horology, of fashion or jewellery items, and more particularly relates to a method for manufacturing an external component of a watch, of a fashion or jewellery item and a method for manufacturing such an external component.

In the present text, the notion "fashion item" comprises clothing accessories or items, such as belts, shoes, clothes, etc. and further comprises eyewear items, telephony items, or any other decorative object.

Technological Background

In particular, in the field of horology, the external components for watches, particularly the dials, flanges, bezels, etc., may have, for decorative purposes, decorations produced from thin layers deposited on the surface of a substrate.

Depending on the dimension and the number of details of the decoration of the external component, the latter may be relatively complex to produce. In particular, when the decoration is formed by a combination of structures on a substrate and by a thin layer deposited on the substrate, the alignment tolerances of the thin layer in relation to the structures are particularly complicated to respect.

In general, the aforementioned problems are also found in the fields of fashion or jewellery items.

In this context, the aim of the present invention is to improve the precision and the quality of the decorations of an external component of a watch, of a fashion or jewellery item.

In particular, the invention solves the problem of respecting the alignment tolerances of the decorations on an external component, particularly the alignment of a thin layer in relation to structures of a face of a substrate on which said thin layer is deposited.

SUMMARY OF THE INVENTION

To this end, the invention relates to a method for manufacturing an external component of a watch, of a fashion item or of a jewellery item, comprising the following steps of:

- depositing an inner layer on all or part of the surface of an inner face of a substrate made of a transparent material,
- localised ablation of the inner layer, so as to conserve a part of said inner layer on a first portion of the inner face of the substrate, said ablation being performed so as to form at least one pocket opening onto a second portion of the inner face of the substrate and so as to structure said second portion of the inner face of the substrate,

- treating the surface of the inner layer and of the inner face of the substrate.

In particular embodiments, the invention may further include one or more of the following features, taken alone or according to any technically possible combinations.

In particular implementations, during a polishing step performed before the step of depositing the inner layer, the inner face of the substrate is polished.

In particular implementations, the method comprises, before performing the step of treating the surface of the inner layer and the inner face of the substrate, a step of engraving the inner layer wherein a part of the inner layer is eliminated so as to shape said layer according to a predefined shape, without the inner face of the substrate being impacted.

In particular implementations, the step of localised ablation of the inner layer is performed by laser beam.

In particular implementations, the method comprises a step of engraving the substrate performed so as to generate a pattern inside the thickness of said substrate, without impacting the inner face, or an outer face of said substrate opposite the inner face.

In particular implementations, the method comprises the following steps of:

- depositing an outer layer on all or part of the surface of an outer face of the substrate,
- localised ablation and/or engraving of the outer layer,
- treating the surface of the outer layer.

In particular implementations, the step of localised ablation of the outer layer is performed so as to:

- conserve a part of the outer layer on a first portion of the outer face of the substrate,
- form at least one pocket opening onto a second portion of the outer face of the substrate, said second portion extending at least facing the second portion of the inner face of the substrate, and
- structure said second portion of the outer face of said substrate.

In particular implementations, the step of engraving the outer layer is performed so that a part of the outer layer is eliminated in order to shape said outer layer according to a predefined shape, without the outer face of the substrate being impacted.

In particular implementations, the step of engraving the outer layer is advantageously performed so that the inner layer is visible through the substrate.

In particular implementations, a polishing step wherein the outer face of the substrate is polished, is performed before the steps of depositing the inner and outer layers.

According to another aspect, the present invention relates to a watch dial formed by implementing the method such as described above.

According to yet another aspect, the present invention relates to a fashion item including an external component formed by implementing the method such as described above.

BRIEF DESCRIPTION OF THE FIGURES

Other features and advantages of the invention will become apparent upon reading the following detailed description given by way of a non-limiting example, and with reference to the accompanying drawings, wherein.

It should be noted that the figures are not to scale.

DETAILED DESCRIPTION OF THE INVENTION

The present invention relates to a method for manufacturing an external component 10 such as shown in FIGS. 2 to 5 in various examples of implementation of said method.

The invention may advantageously be an external component of a watch, such as a dial, an external component of a fashion item, or of a jewellery item.

The terms “fashion items” define in the present text any external accessory or item, such as a belt, a shoe, clothing, etc., and further comprises eyewear items, telephony items, such as telephone casings, or any decorative object.

Figure 1:
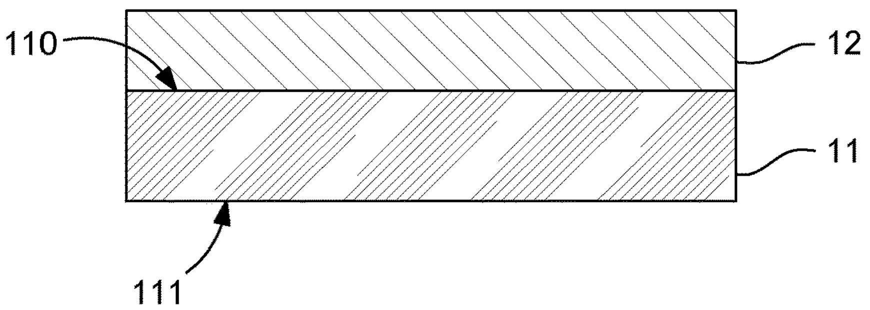
FIG. 1 schematically shows in sectional view, an external component being produced by implementing a step of a manufacturing method according to the invention.

The manufacturing method comprises a first step of depositing a thin layer, referred to as “inner layer” 12, on all or part of the surface of an inner face 110 of a substrate 11 made of a transparent material, such as shown in FIG. 1. It should be noted that the term “transparent” designates in the present text a capacity of a material to allow all or part of a light ray, particularly light visible to the naked eye, to pass through. Such a transparent material may be sapphire, glass, etc.

The inner face 110 of the substrate 11 is opposite an outer face 111 from which a user is intended to see a decoration of the external component 10, through said substrate 11. More particularly, the outer face 111 is intended to be oriented towards an external environment and the inner face 110 is intended to be orientated towards an internal environment, for example facing a horological movement, in the case wherein the external component 10 is a component of a watch.

Such a deposition may be performed by a physical vapour deposition, chemical vapour deposition method, or by any other appropriate method. By way of example, the inner layer 12 may be made of a metal material, particularly Cr, Au, Ti, Zr, or of a dielectric material, alone or as an alloy.

Preferably, the inner face 110 is polished during a preliminary polishing step, prior to depositing the inner layer 12.

Figure 2:
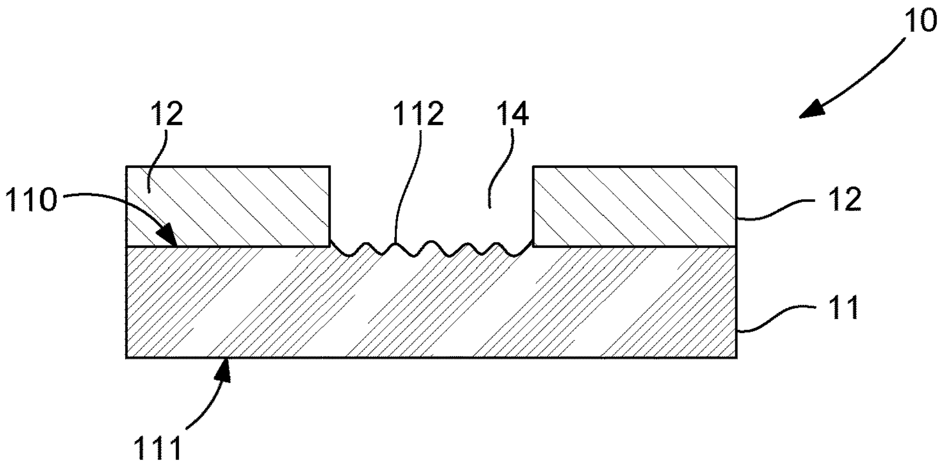
FIGS. 2 to 5 schematically show in sectional view, an external component obtained by implementing the manufacturing method according to the invention in various examples of implementation.

The method subsequently includes a step of localised ablation of the inner layer 12, so as to form a pocket or pockets 14 opening onto the inner face 110 of the substrate 11, and at the same time, to structure said inner face 110 at the or each of the pockets 14 in order to produce a structure 112, such as shown in FIG. 2.

Naturally, the method may include a plurality of localised ablation steps, so as to produce a plurality of structures 112. In particular, the ablation steps may be performed with different parameters so as to produce structures 112 of different appearances. Nevertheless, in the present description of the invention, reference is made below to a single structure 112 to facilitate the reading of the text. The notion of “structure” defines here a surface the condition of which, that is to say the topography, has been modified and it may consist in satin finishing, texturing, engraving, etc.

It should be noted that the parameters used for implementing the ablation step(s) are determined according to the desired appearance of the structure(s) 112, their determination being within the capabilities of the person skilled in the art.

At the end of the localised ablation step, the part of the inner layer 12 not impacted by the ablation rests against a first portion of the inner face 110 of the substrate 11 and the pockets 14 open onto a second portion of the inner face 110 of the substrate 11, said second portion of the inner face 110 being structured. Thus, structure 112 coincides perfectly with the pocket 14 with which it is generated. The respect of the alignment tolerances of the inner layer 12 with the structure 112 of the inner face 110 is therefore guaranteed.

The local ablation of the inner layer 12, and consequently, the structure 112 of the second portion of the inner face 110, is preferably performed by laser beam. Alternatively, the local ablation step may be performed by mechanical machining, such as by robotised engraving with a diamond tip, by chemical machining, etc.

A step of treating the surface of the inner layer 12 and of the inner face 110 of the substrate 11, particularly of the second portion of said inner face 110, is subsequently performed. Such a treatment may consist in depositing a layer of anti-reflection coating or a coating consisting of a layer of metal, organic, ceramic, semi-conductive, oxide, carbide, nitride, lacquer or enamel material.

Figure 3:
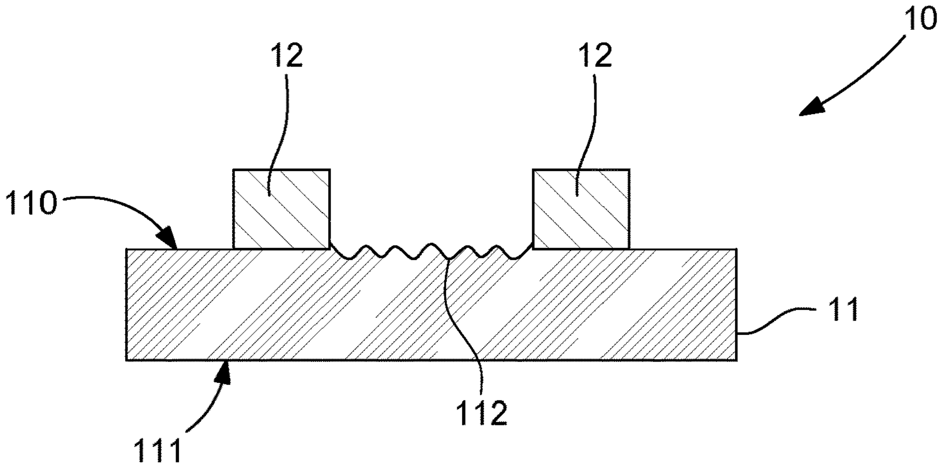

Advantageously, in one example of implementation, the method according to the invention may include, before performing the step of treating the surface of the inner layer 12 and of the inner face 110 of the substrate 11, a step of engraving the inner layer 12 wherein a part of the inner layer 12 is eliminated so as to shape said layer according to a predefined shape, without the inner face 110 of the substrate 11 being impacted, such as shown in FIG. 3.

Such an engraving step may be implemented by photolithography, laser machining, etc.

Advantageously, the method may include a step of engraving the substrate 11 performed so as to generate a pattern inside the thickness of said substrate 11, without impacting the inner face 110, or an outer face 111 of said substrate 11 opposite the inner face 110. This feature makes it possible to enhance the decoration generated by implementing the method according to the invention.

Figure 4:
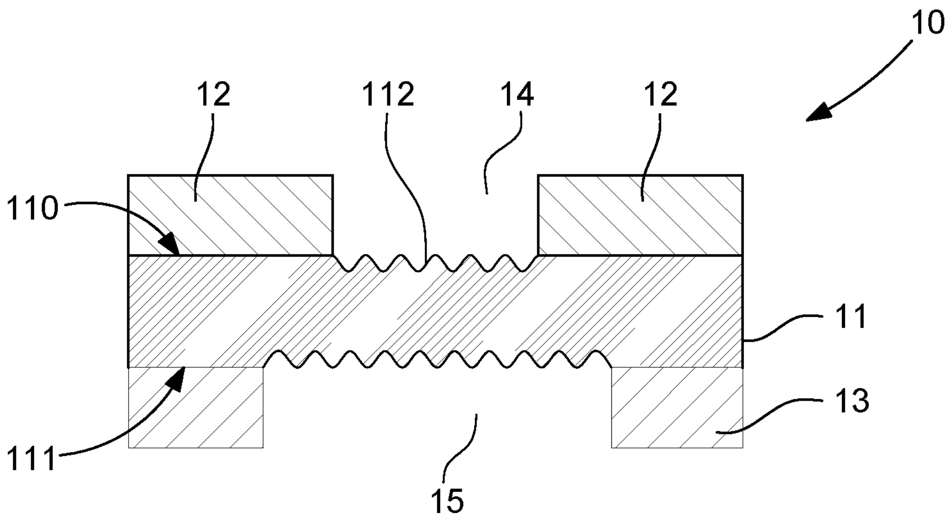

In one example of implementation, the method according to the invention may include a step of depositing a thin layer, referred to as “outer layer” 13, on all or part of the surface of an outer face 110 of the substrate 11, followed by a step of localised ablation of the outer layer 13, as shown in FIG. 4.

The ablation is performed so that a part of the outer layer 13 is conserved on a first portion of the outer face 111 of the substrate 11, and so as to form at least one pocket 15 opening onto a second portion of the outer face 110 of the substrate 11 and to structure, at the same time, said second portion of the outer face 110. In order to generate an attractive decoration, the second portion of the outer face 111 extends at least facing the second portion of the inner face 110 of the substrate 11. Thus, the inner layer 12 and the structure 112 are visible through the pocket 15.

Figure 5:
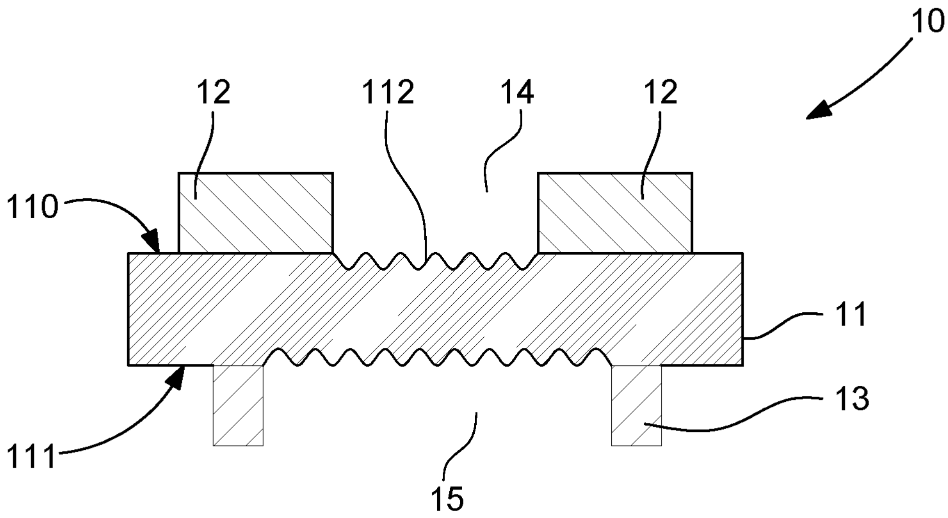

In addition or alternatively to the step of localised ablation of the outer layer 13, the method may comprise a step of engraving the outer layer 13, in a similar manner to the step of engraving the inner layer 12. Such an engraving step is shown in FIG. 5, in combination with the step of localised ablation of the outer layer 13. The step of engraving the outer layer 13 is advantageously performed so that a part of the outer layer 13 is eliminated in order to shape said layer according to a predefined shape, without the outer face 111 of the substrate 11 being impacted. Such an engraving step may be implemented by photolithography, laser machining, etc.

The result of the step of engraving the outer layer 13 is shown in FIG. 5, wherein the inner layer 12 shaped in a predefined shape is also visible at the end of the step of engraving the inner layer 12, such as described above in the text.

In other words, the inner 12 and outer layers 13 may one and the other be eliminated locally so as to generate specific decorations. In particular, the step of engraving the outer layer 13 is advantageously performed so that the inner layer 12 is visible through the substrate 11. In other terms, the step of engraving the outer layer 13 is performed so that a projection of the inner layer 12 on the outer surface 111 of the substrate 11 extends beyond the outer layer 13, as shown in FIG. 5.

The outer layer 13 and the outer face 111 of the substrate 11, particularly the second portion of said outer face 111, may subsequently be subjected to a surface treatment, for example such as described above for the inner layer 12 and the second portion of the inner face 110 of the substrate 11.

Advantageously, the outer face 111 of the substrate may be polished during a polishing step performed before the step of depositing the outer layer 13 and before the step of depositing the inner layer 12, in order to avoid deteriorating said layers.

It should be noted that, thanks to the features of the invention, the visual appearance of the decoration of the external component 10 may be particularly rich and attractive insofar as the contrast between the possible difference in colours of the inner layer 12 and of the outer layer 13, adds to the contrast between the surface conditions of the portions of the inner face 110 and of the outer face 111 of the substrate 11, whereon said layers are respectively deposited. Moreover, the method according to the invention makes it possible to generate a visual effect of depth between the inner 12 and outer layers 13.

More generally, it should be noted that the implementations and embodiments considered above have been described by way of non-limiting examples, and that other alternatives are consequently possible.

In particular, the inner layer 12 and/or the outer layer 13 may consist of a stack of thin layers, in a manner known per se by the person skilled in the art.

The invention claimed is:

1. A method for manufacturing an external component of a watch, of a fashion item or of a jewellery item, wherein the method comprises the following steps of:

depositing an inner layer on all or part of a surface of an inner face of a substrate made of a transparent material, localised ablation of the inner layer, so as to conserve a part of said inner layer on a first portion of the inner face of the substrate, said ablation being performed so as to form at least one pocket opening onto a second portion of the inner face of the substrate and so as to structure said second portion of the inner face of the substrate, treating the surface of the inner layer and of the second portion of the inner face of the substrate, depositing an outer layer on all or part of a surface of an outer face of the substrate, localised ablation and/or engraving of the outer layer, treating the surface of the outer layer.

2. The method according to claim 1, further comprising a polishing step performed before the step of depositing the inner layer, wherein the inner face of the substrate is polished during said polishing step.

3. The method according to claim 1, comprising, before performing the step of treating the surface of the inner layer and of the second portion of the inner face of the substrate, a step of engraving the inner layer wherein a part of the inner layer is eliminated so as to shape said layer according to a predefined shape, without the inner face of the substrate being impacted.

4. The method according to claim 1, wherein the step of localised ablation of the inner layer is performed by laser beam.

5. The method according to claim 1, comprising a step of engraving the substrate performed so as to generate a pattern inside the thickness of said substrate, without impacting the inner face, or an outer face of said substrate opposite the inner face.

6. The method according to claim 1, wherein the step of localised ablation of the outer layer is performed so as to:

conserve a part of the outer layer on a first portion of the outer face of the substrate, form at least one pocket opening onto a second portion of the outer face of the substrate, said second portion extending at least facing the second portion of the inner face of the substrate, and structure said second portion of the outer face of said substrate.

7. The method according to claim 1, wherein the step of engraving the outer layer is performed so that a part of the outer layer is eliminated in order to shape said outer layer according to a predefined shape, without the outer face of the substrate being impacted.

8. The method according to claim 7, wherein the step of engraving the outer layer is advantageously performed so that the inner layer is visible through the substrate.

9. The method according to claim 1, wherein, a polishing step wherein the outer face of the substrate is polished, is performed before the steps of depositing the inner and outer layers.

10. The method according to claim 1, wherein the external component is part of the watch and the inner face is oriented towards an internal environment of the watch.

11. The method according to claim 1, wherein the external component is a dial of the watch and the inner face is oriented towards a horological movement of the watch.

* * * * *